(12) United States Patent
Martin et al.

(10) Patent No.: US 11,162,591 B2
(45) Date of Patent: Nov. 2, 2021

(54) SEAL RING ASSEMBLY FOR A DYNAMOELECTRIC MACHINE

(71) Applicant: General Electric Company, Schenectady, NY (US)

(72) Inventors: Matthew Robert Martin, Schenectady, NY (US); James Jonathan Grant, Niskayuna, NY (US); Anthony James George, Clifton Park, NY (US); Eric Steven Buskirk, Scotia, NY (US); Daniel James Fitzmorris, Clifton Park, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 377 days.

(21) Appl. No.: 15/066,069

(22) Filed: Mar. 10, 2016

(65) Prior Publication Data

US 2017/0261107 A1    Sep. 14, 2017

(51) Int. Cl.
| | | |
|---|---|---|
| *F16J 15/34* | (2006.01) | |
| *F16J 15/44* | (2006.01) | |
| *F16J 15/24* | (2006.01) | |
| *H02K 5/124* | (2006.01) | |

(52) U.S. Cl.
CPC ........... *F16J 15/3452* (2013.01); *F16J 15/24* (2013.01); *F16J 15/3484* (2013.01); *F16J 15/3496* (2013.01); *F16J 15/441* (2013.01); *H02K 5/124* (2013.01)

(58) Field of Classification Search
CPC ...... F16J 15/24; F16J 15/3484; F16J 15/3496; F16J 15/441; F16J 15/3452
See application file for complete search history.

(56) References Cited

U.S. PATENT DOCUMENTS

| | | | | |
|---|---|---|---|---|
| 3,462,159 | A | * 8/1969 | Baumann | F04D 29/126 277/422 |
| 3,469,851 | A | * 9/1969 | Enemark | F16J 15/3464 277/370 |
| 3,912,342 | A | * 10/1975 | Schirm | F16J 15/441 384/131 |
| 3,948,533 | A | * 4/1976 | Novosad | F16J 15/3464 277/370 |

(Continued)

FOREIGN PATENT DOCUMENTS

| | | | |
|---|---|---|---|
| CN | 201101958621 | * | 2/2010 |
| DE | 10 2009 025941 A1 | | 12/2009 |

(Continued)

OTHER PUBLICATIONS

Extended European Search Report and Opinion issued in connection with corresponding EP Application No. 17160093.5 dated Jul. 19, 2017.

(Continued)

*Primary Examiner* — Eugene G Byrd
(74) *Attorney, Agent, or Firm* — Hoffman Warnick LLC

(57) ABSTRACT

A seal ring assembly for a rotor shaft includes a seal casing defining a radially inwardly directed channel. The seal ring is disposed in the radially inwardly directed channel of the seal casing. The seal ring is resiliently joined about the shaft to form a seal, and the seal ring comprises an electrically insulating or dissipative material or a non-metallic material.

20 Claims, 6 Drawing Sheets

(56) References Cited

U.S. PATENT DOCUMENTS

| | | | | |
|---|---|---|---|---|
| 4,486,024 | A * | 12/1984 | Cooper | F16J 15/40 |
| | | | | 277/422 |
| 4,815,748 | A * | 3/1989 | Schubert | F16J 15/441 |
| | | | | 277/422 |
| 4,998,740 | A * | 3/1991 | Tellier | F16J 15/025 |
| | | | | 277/362 |
| 5,238,308 | A * | 8/1993 | Lang | F16C 25/02 |
| | | | | 277/411 |
| 5,598,763 | A * | 2/1997 | Rao, V | F16J 1/08 |
| | | | | 277/442 |
| 6,378,873 | B1 * | 4/2002 | Mayer | F16J 15/28 |
| | | | | 277/355 |
| 6,427,790 | B1 * | 8/2002 | Burr | E21B 10/25 |
| | | | | 175/371 |
| 6,431,550 | B1 * | 8/2002 | Tong | F16J 15/442 |
| | | | | 277/346 |
| 6,585,270 | B2 | 7/2003 | Tong | |
| 7,538,464 | B2 * | 5/2009 | Hemmi | H02K 9/193 |
| | | | | 277/346 |
| 7,581,734 | B1 | 9/2009 | McLeod | |
| 7,634,963 | B2 * | 12/2009 | Maier | C09D 171/10 |
| | | | | 92/212 |
| 10,208,862 | B2 * | 2/2019 | Fitzmorris | H02K 5/124 |
| 2005/0206249 | A1 * | 9/2005 | Hashiba | F16J 15/26 |
| | | | | 310/54 |
| 2007/0069596 | A1 | 3/2007 | Hemmi et al. | |
| 2009/0302543 | A1 | 12/2009 | Ruggiero et al. | |
| 2011/0006519 | A1 | 1/2011 | Weh | |
| 2013/0057108 | A1 | 3/2013 | Nair | |
| 2014/0369821 | A1 * | 12/2014 | Finck | H02K 5/124 |
| | | | | 415/174.5 |

FOREIGN PATENT DOCUMENTS

| | | | | |
|---|---|---|---|---|
| EP | 0 788 213 | A1 | 8/1997 | |
| GB | 2076480 | A | 12/1981 | |
| JP | 57173352 | A * | 10/1982 | H02K 5/124 |
| JP | S57-173352 | A | 10/1982 | |
| JP | S57173352 | A | 10/1982 | |
| JP | 5146118 | A | 6/1993 | |
| JP | 06101716 | A * | 4/1994 | F16C 25/02 |
| JP | 2011512495 | A | 4/2011 | |

OTHER PUBLICATIONS

EP Search Report for corresponding EP Patent Application No. 17160093.5 dated Oct. 15, 2019, 2 pages.
English Translation of JP Communication for corresponding JP Application No. 2017-031630 dated Jun. 3, 2021, 2 pages.
Japanese Office Action and English Translation thereof for JP Application No. 2017-031630 dated Apr. 9, 2021, 19 pages.

* cited by examiner

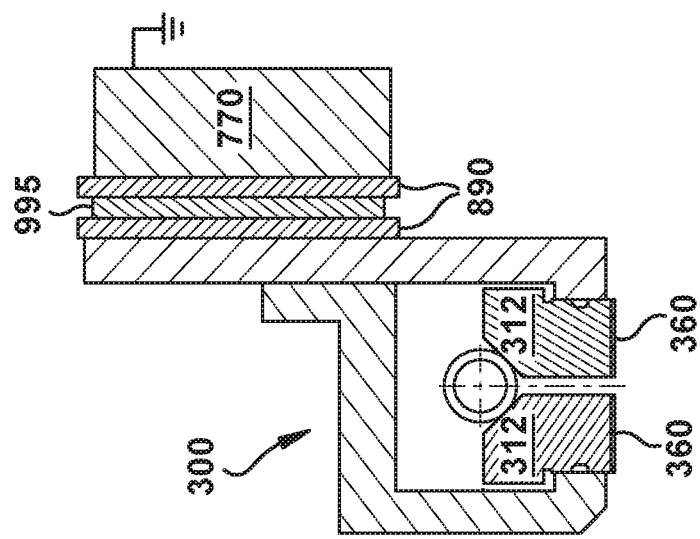
FIG. 7
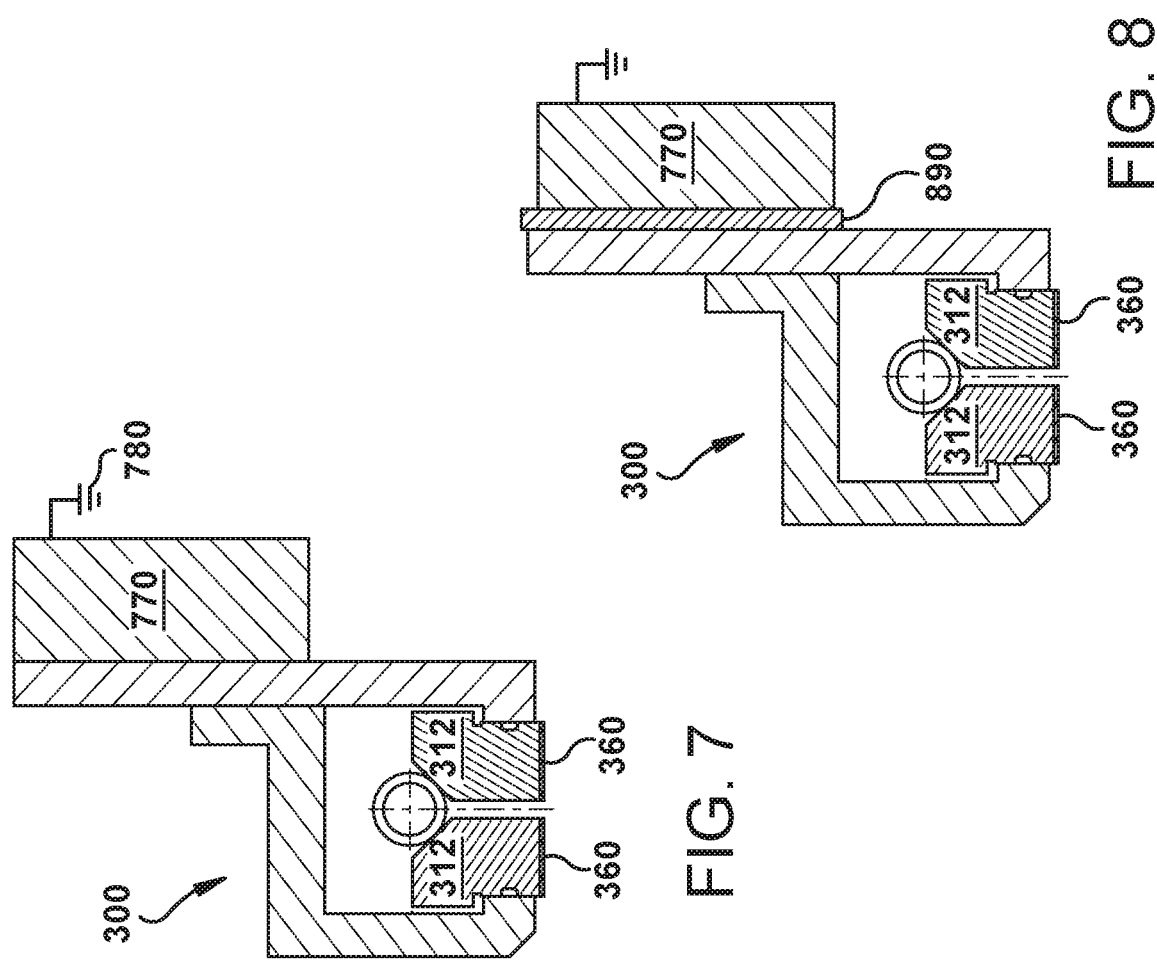
FIG. 8
FIG. 9

SEAL RING ASSEMBLY FOR A DYNAMOELECTRIC MACHINE

BACKGROUND OF THE INVENTION

The apparatus described herein relates generally to seal rings for dynamoelectric machines and, more specifically, to a seal structure that reduces damage caused by shaft currents.

Hydrogen has been widely used as a coolant in a variety of dynamoelectric machines (e.g., generators or motors), due to its desirable thermophysical properties including low density and high specific heat. However, a primary disadvantage of using hydrogen is that the hydrogen purity must be maintained above its explosive limit (74% hydrogen in air). Therefore, a primary consideration for ensuring the safe operation of hydrogen-cooled dynamoelectric machines is designing highly reliable and efficient hydrogen seal systems therefor.

In a hydrogen-cooled generator, hydrogen seals are utilized both to seal high-pressure hydrogen at the interface of the rotating shaft, and to prevent air from entering the casing and developing an explosive mixture with the hydrogen. Before the early 1980s, hydrogen seal systems consisted of a pair of four segmented bronze rings disposed in a seal casing. The newer babbitted steel seal rings 10 are each made in two 180° segments 12, 14 as illustrated in FIG. 1. A typical hydrogen seal system is schematically shown in FIG. 2. In that illustration, an annular seal casing is partially shown which is adapted to be mounted to a generator end shield (not shown) in surrounding and sealing relationship with a rotor/shaft 16. The casing is formed in two main parts, referred to hereinbelow as casing halves, each extending 180° about the shaft. For ease of description, the upper casing half 18 and the seal ring segments 12 disposed therein are illustrated and will be described in detail. It is to be understood, however, in an exemplary embodiment, the lower casing half has a corresponding construction. The upper casing half 18 is of two-part construction, including a seal casing main body 20 and a seal casing cap segment 22. The seal casing cap segment has a generally h-shaped cross-section, forming a radially inwardly directed chamber 24 (or cell 24) opening in a radially inward direction towards the shaft 16 for housing radially inwardly projecting seal rings 12 which in turn engage the shaft.

Each seal casing cap segment 22 is formed with an axial portion 26 connecting an upper radial flange portion 28 and lower inner and outer radial portions 30, 32. The axial portion 26 thus defines a base for the chamber 24 while radial portions 30 and 32 form two, axially spaced, parallel sides of the chamber 24. Axially opposed shoulders 34, 36 define an opening facing the rotor shaft 16. The seal casing cap segment 22 is fastenable to the seal casing main body 20 by a semi-annular array of bolts 38 passing through holes in the radial portion 28 of the cap and threadably received in the main body 20.

Within the chamber or cell 24, there are seated a pair of side-by-side seal ring segments 12, each extending approximately 180° about the casing half 18. The rings 10 are held together radially and apart axially by coil springs 40 (only one of which is shown in FIG. 2), each extending substantially 180° within the cell or chamber. The spring is seated within an area created by tapered surfaces 42 on the respective ring segments 12. The spring biases the seal rings 12 radially inwardly and in axially opposite directions, against opposed faces of the inner and outer radial wall portions 30, 32 of the chamber 24.

In use, seal oil is introduced into the cavity of chamber 24 behind or radially outside the seal rings 12, at a pressure higher than the hydrogen pressure inside the casing. Then, the high pressure seal oil flows radially between the seal rings toward the rotating shaft, where the sealing oil flow divides and runs with the clearance between the shaft and seal rings. At the hydrogen side 48 of the seal rings, the oil flows evenly between the shaft and the inner seal ring all the way around the seal ring at their interface and thus seals hydrogen from leaking and keeps the seal ring centered on the shaft. Similarly, the oil is uniformly distributed between the shaft 16 and the outer seal ring 10 at the air side 50 of the seal. Hydrogen is absorbed by the oil that passes to the hydrogen side of the seals. The amount of hydrogen that is absorbed is proportional to the oil flow rate and the degree of solubility of hydrogen in oil. In general, a large oil flow rate yields high hydrogen consumption.

During machine operation, shaft currents can travel from shaft 16 through babbitted steel rings 12 to casing 18 and then to ground. Unfortunately, these shaft currents can cause electrical pitting. In addition, high temperatures may cause oil coking on the rings 12 from overheating, or hot corrosion damage due to weakening of the steel rings 12 after prolonged exposure to high temperatures.

BRIEF DESCRIPTION OF THE INVENTION

In an aspect of the present invention, a seal ring assembly for a rotor shaft includes a seal casing defining a radially inwardly directed channel. The seal ring is disposed in the radially inwardly directed channel of the seal casing. The seal ring is resiliently joined about the shaft to form a seal, and the seal ring comprises an electrically insulating material or a non-metallic material.

In another aspect of the present invention, a seal ring assembly for a rotor shaft includes an upper seal casing defining a first radially inwardly directed channel, and a lower seal casing defining a second radially inwardly directed channel. A first seal ring and a second seal ring are each respectively disposed in the first and second radially inwardly directed channels of the upper and lower seal casings. The first seal ring and the second seal ring are resiliently joined about the shaft to form a substantially 360° seal. The first seal ring and the second seal ring are biased radially inwardly by one or more springs. Each of the first and second seal rings have adjacent tapered surfaces, and the springs are configured to be seated against the adjacent tapered surfaces. The first seal ring and the second seal ring comprise an electrically insulating or dissipative material or a non-metallic material.

In yet another aspect of the present invention, a seal ring assembly for a rotor shaft includes an upper seal casing defining a first radially inwardly directed channel, and a lower seal casing defining a second radially inwardly directed channel. A first seal ring and a second seal ring are each respectively disposed in the first and second radially inwardly directed channels of the upper and lower seal casings. The first seal ring and the second seal ring are resiliently joined about the shaft to form a substantially 360° seal. The first seal ring and the second seal ring are biased radially inwardly by one or more springs. The first and second seal rings having adjacent tapered surfaces, and the springs are configured to be seated against the adjacent tapered surfaces. Each of the first seal ring and the second seal ring include an electrically insulating material that is polyether ether ketone.

BRIEF DESCRIPTION OF THE DRAWINGS

FIG. 7 illustrates a schematic and partial cross-sectional view of a seal ring assembly and electrical insulation system for a dynamoelectric machine, according to an aspect of the present invention.

FIG. 8 illustrates a schematic and partial cross-sectional view of a seal ring assembly and electrical insulation system for a dynamoelectric machine, according to an aspect of the present invention.

FIG. 9 illustrates a schematic and partial cross-sectional view of a seal ring assembly and electrical insulation system for a dynamoelectric machine, according to an aspect of the present invention.

DETAILED DESCRIPTION OF THE INVENTION

One or more specific aspects/embodiments of the present invention will be described below. In an effort to provide a concise description of these aspects/embodiments, all features of an actual implementation may not be described in the specification. It should be appreciated that in the development of any such actual implementation, as in any engineering or design project, numerous implementation-specific decisions must be made to achieve the developers' specific goals, such as compliance with machine-related, system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," and "the" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "one aspect" or "an embodiment" or "an aspect" of the present invention are not intended to be interpreted as excluding the existence of additional embodiments or aspects that also incorporate the recited features.

Figure 3:
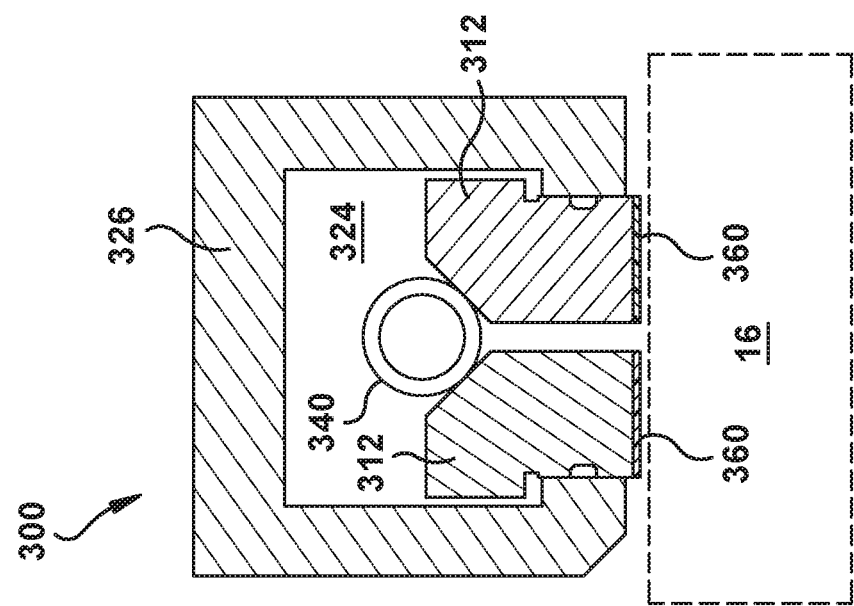
FIG. 3 illustrates a schematic and partial cross-sectional view of a seal ring assembly for a dynamoelectric machine, according to an aspect of the present invention.

FIG. 3 illustrates a schematic and partial cross-sectional view of a seal ring assembly 300 for a dynamoelectric machine. The dynamoelectric machine may be a motor, generator, a hydrogen cooled generator or any other machine in need of the disclosed seal assembly. The seal ring assembly 300 is located circumferentially around the rotor shaft 16. The seal casing 326 defines a radially inwardly directed channel 324. The seal rings 312 are disposed in the radially inwardly directed channel 324 of the seal casing 326, and each seal ring 312 is resiliently joined about the rotor shaft 16 to form a seal. An upper seal casing and a lower seal casing (not shown) are disposed on both sides of the rotor shaft 16 and combine to form a substantially 360 degree seal. The seal rings 312 are biased radially inwardly by the one or more springs 340. The seal rings 312 include an electrically insulating material 360 or a non-metallic material 360. Electrically insulating materials are broadly defined to include insulating, dissipative and anti-static materials. The material 360 is located on a radially inward facing surface of the seal ring, and in a location that is directly opposed to the rotor shaft 16. For example, the material 360 may be a layer that is about 1 mm to about 4 mm thick, have a dielectric strength of about 15 kV/mm to about 40 kV/mm and a volume resistivity of about $1 \times 10^7$ Ohms-inch to about $1 \times 10^{15}$ Ohms-inch. The resistivity can span the range from dissipative to insulating, depending on the properties required. However, suitable values above or below these ranges, and any suitable non-metallic and/or electrically insulating or dissipative material may be used as desired in the specific application.

Figure 1:
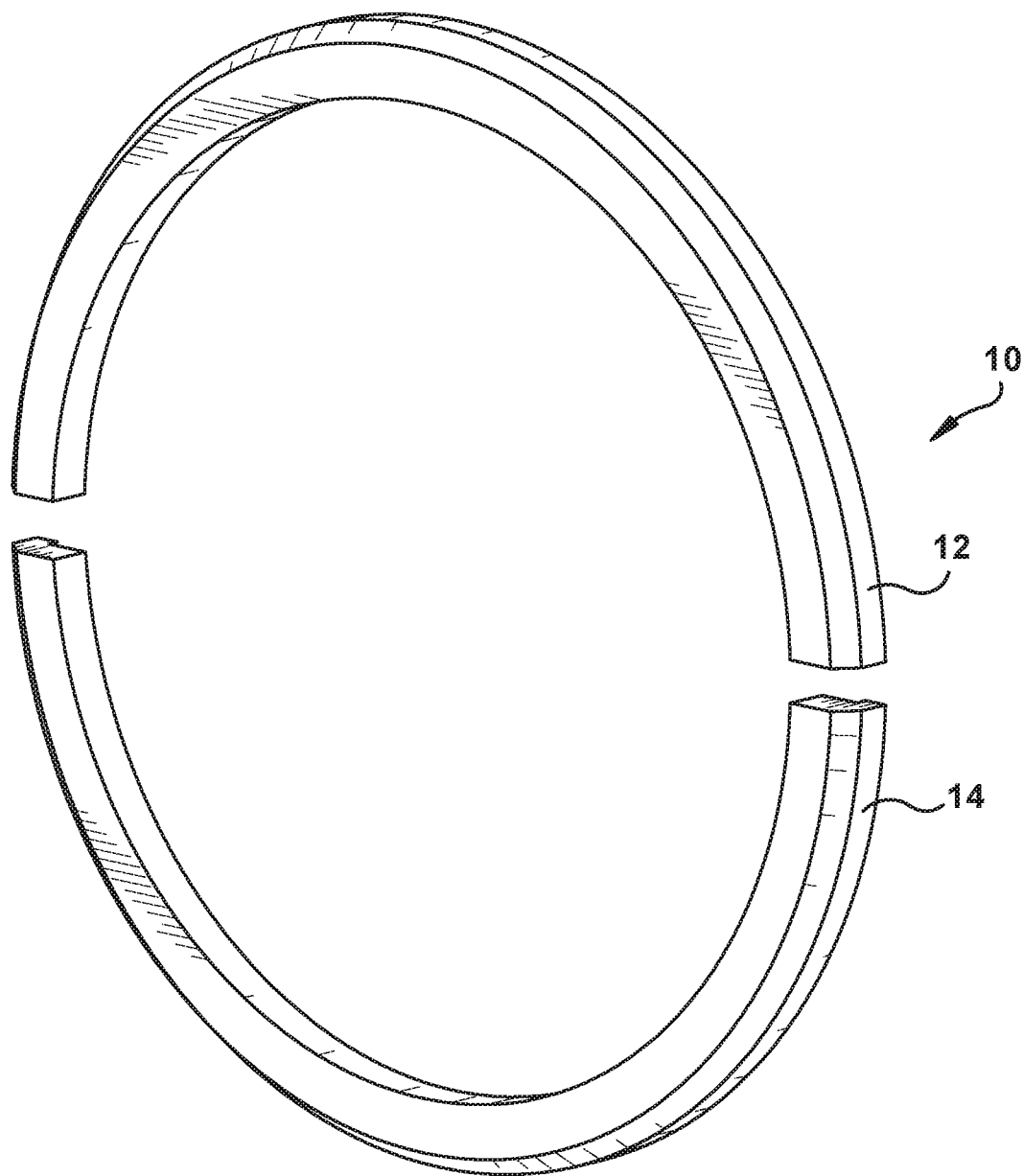
FIG. 1 illustrates a perspective view showing upper and lower seal rings.
Figure 2:
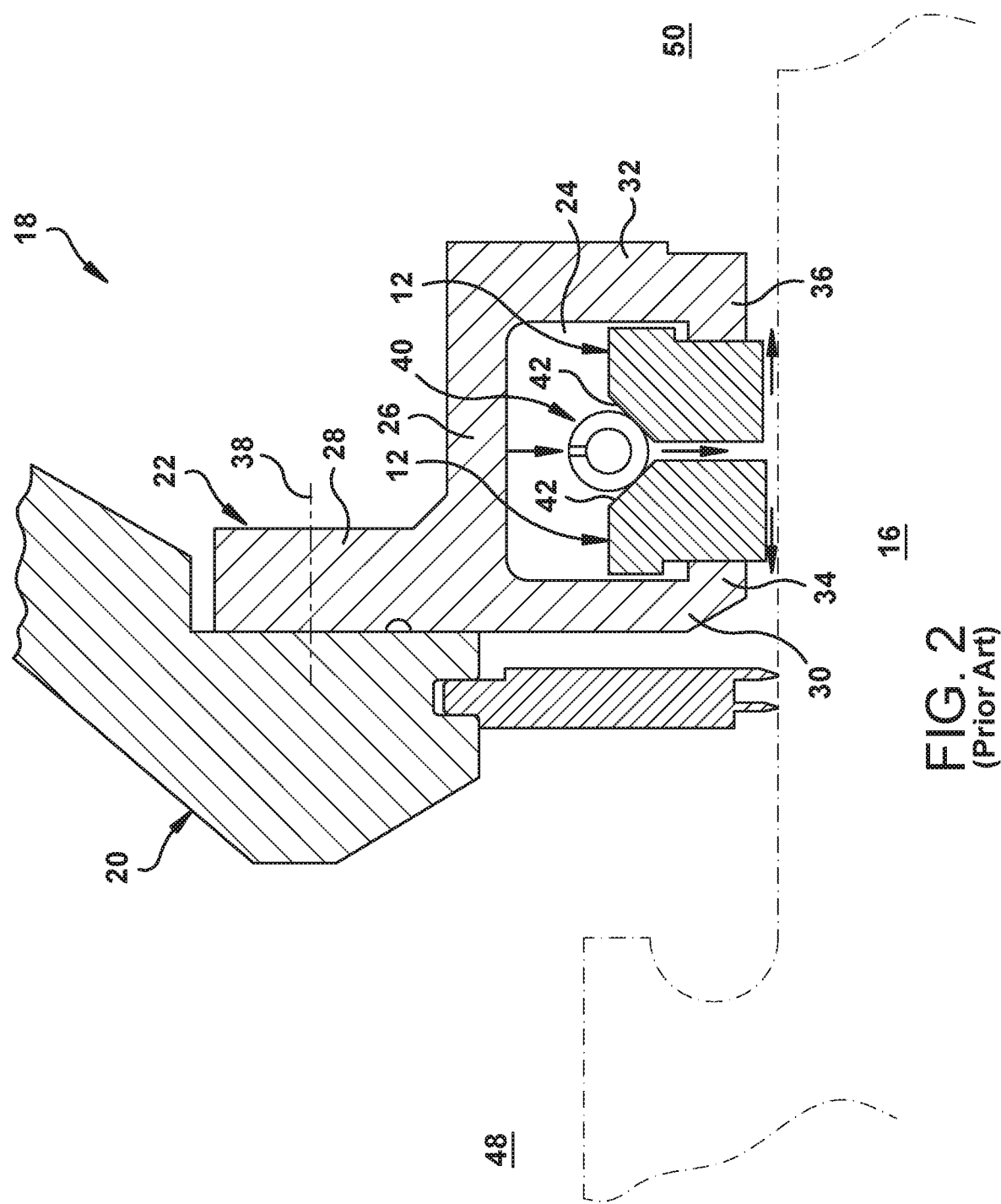
FIG. 2 illustrates a schematic cross-sectional view of a seal system for a dynamoelectric machine.
Figure 4:
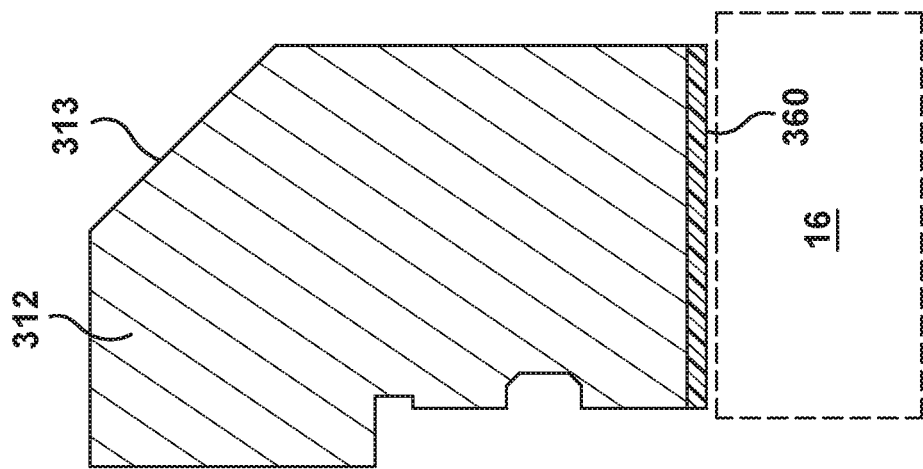
FIG. 4 illustrates an enlarged cross-sectional view of one seal ring, according to an aspect of the present invention.

FIG. 4 illustrates an enlarged cross-sectional view of one seal ring 312. The seal ring 312 may be comprised of steel, or some other suitable metal, and includes a tapered surface 313. The spring 340 is configured to seat against the tapered surface 313 and bias the seal ring 312 in a radially inward and axial direction. With specific reference to FIG. 4, the spring 340 would push the seal ring 312 down and to the left. A neighboring seal ring (as shown in FIG. 3) also includes an adjacent tapered surface, and this seal ring would be pushed down and to the right.

The electrically insulating and/or non-metallic material 360 may be an organic thermoplastic polymer, polyether ether ketone, or any other suitable material. Polyether ether ketone is both substantially electrically insulating and non-metallic, so it is a suitable material for use in the present invention. Preferably, the material 360 is a layer of electrically insulating material sufficient to reduce or stop rotor shaft currents from passing through the seal rings 312 and the seal casing 326. As mentioned above, rotor shaft currents passing through the seal rings and seal casings may cause electrical pitting of the seal rings, seal casing or both. Excessive electrical pitting can reduce machine efficiency or even machine shut down in extreme cases. An advantage to polyether ether ketone (and other suitable organic thermoplastic polymers) is that it can operate at high temperatures while retaining dimensional stability. These features allow the seal rings to withstand elevated hydrogen seal oil temperature excursions as well as high seal ring temperatures due to a variety of causes. Polyether ether ketone also has excellent hydrolysis and chemical resistance, which allows for greater ability to withstand surface corrosion while the seal rings are in a hydrogen environment. Steel seal rings typically have a tin-copper-antimony containing alloy (babbitt) located at a radially inner portion of the seal rings. Non-metallic materials at the seal ring/rotor interface would eliminate the effects of hot corrosion, which is a weakening of the babbitt material where high oil temperatures cause the copper constituent to react with chemicals in the oil leaving the babbitt copper depleted. Loss of copper lowers the strength and melting point of the babbitt.

Figure 5:
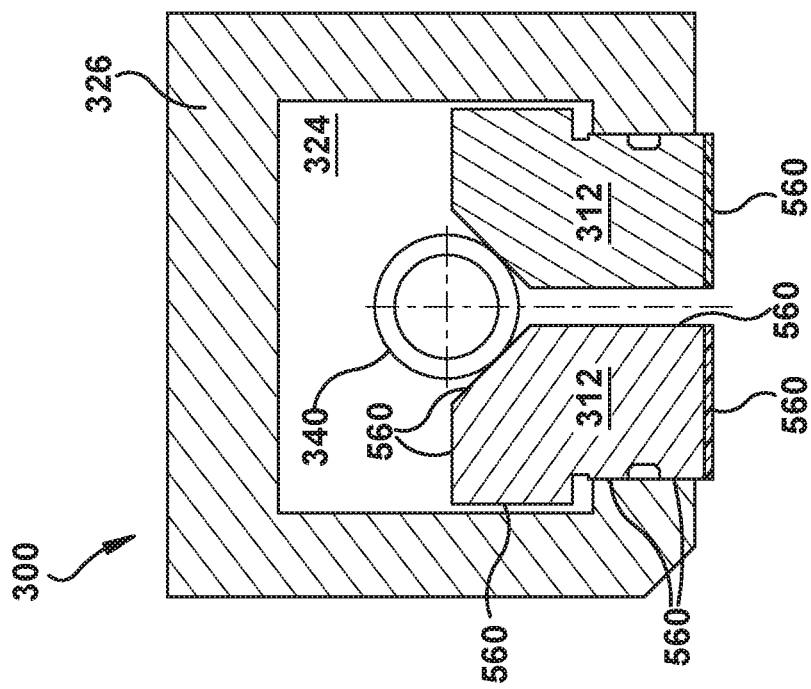
FIG. 5 illustrates a schematic and partial cross-sectional view of a seal ring assembly for a dynamoelectric machine, according to an aspect of the present invention.

FIG. 5 illustrates a schematic and partial cross-sectional view of a seal ring assembly 300 for a dynamoelectric machine. The electrically insulating and/or non-metallic material 560 is located on substantially all exterior surfaces of the seal ring 312. The full coating of material 560 further enhances the insulation effect of the seal rings. The material 560 may be coated or deposited on the seal rings 312 by any suitable process. Alternatively, material 560 may be attached to seal rings 312 by the use of adhesive or mechanical fasteners.

Figure 6:
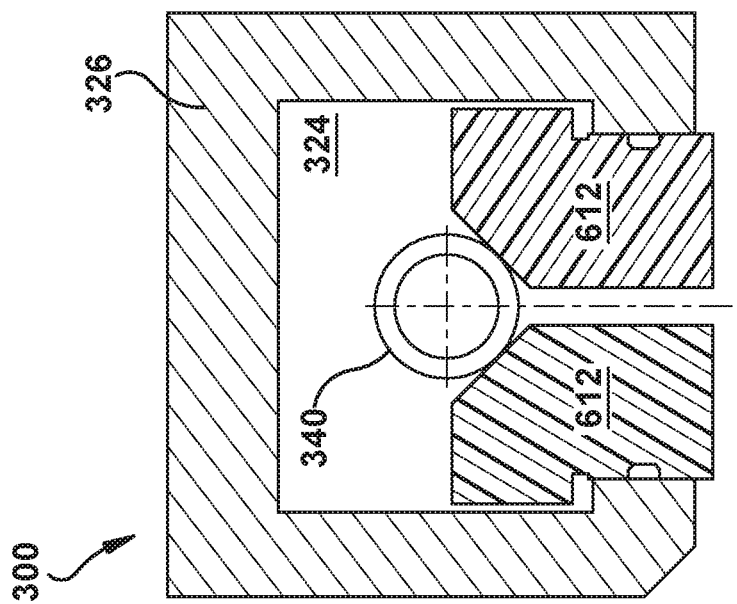
FIG. 6 illustrates a schematic and partial cross-sectional view of a seal ring assembly for a dynamoelectric machine, according to an aspect of the present invention.

FIG. 6 illustrates a schematic and partial cross-sectional view of a seal ring assembly 300 for a dynamoelectric machine. The seal rings 612 are comprised substantially or entirely of the electrically insulating and/or non-metallic material. As mentioned above the material may be an organic thermoplastic polymer, such as polyether ether ketone. Even greater insulation effects may be obtained with seal rings 612 made entirely of the electrically insulating and/or non-metallic material, as no part of the seal ring 612 is electrically conductive.

The organic thermoplastic polymer and polyether ether ketone materials provide several benefits over known steel babbitted seal rings. Suitable organic thermoplastic polymer materials and polyether ether ketone are electrically insulating, exhibit high temperature performance (e.g., continuous use at temperatures up to about 500° F.), exhibit excellent hydrolysis, low friction and are self-lubricating. These latter features reduce wear on rotor shaft 16. Dimensional stability is improved over steel rings and the non-metallic materials exhibit excellent long term creep and fatigue capability. A further advantage of organic thermoplastic polymer and polyether ether ketone materials over steel is that the non-metallic materials provide a weight reduction in the seal rings fabricated entirely of organic thermoplastic polymer or polyether ether ketone materials. The lighter seal rings permit the use of weaker springs 340 and this facilitates assembly and disassembly.

FIG. 7 illustrates a schematic and partial cross-sectional view of a seal ring assembly and electrical insulation system for a dynamoelectric machine. In an uninsulated arrangement the seal ring assembly 300 is electrically connected to ground 780 through the end shield 770. The direct metal-to-metal conductive contact between the casing and the end shield 770 is typically used on the turbine end side of the generator. In contrast the collector end of the generator is usually insulated. However, by locating the electrically insulating and/or non-metallic material 360, at least on the radial inner surface of the seal rings 312, the seal ring assembly provides a single insulated arrangement on the turbine end side of the generator.

FIG. 8 illustrates a schematic and partial cross-sectional view of a seal ring assembly and electrical insulation system for a dynamoelectric machine. In a single insulated arrangement the seal ring assembly 300 is electrically insulated from end shield 770 by insulating mounting ring 890. The non-metallic mounting ring is placed between the seal casing and the end shield 770 to act as an electrically insulating barrier. However, this arrangement does not allow for online insulation resistance measurements unless the shaft 16 is insulated from the bearing/end shield 770. However, by locating the electrically insulating and/or non-metallic material 360, at least on the radial inner surface of the seal rings 312, the seal ring assembly now provides a double insulated arrangement.

FIG. 9 illustrates a schematic and partial cross-sectional view of a seal ring assembly and electrical insulation system for a dynamoelectric machine. In a double insulated arrangement the seal ring assembly 300 is electrically insulated from end shield 770 by two insulating mounting rings 890 that are sandwiched over a metallic mounting ring 995. This arrangement does allow for online insulation resistance measurements without insulating the rotor shaft 16 from the bearing/end shield 770. However, the various metallic and non-metallic rings add a significant amount of cost and complexity. The addition of the electrically insulating and/or non-metallic material 360, at least on the radial inner surface of the seal rings 312, creates a triple insulated arrangement. An advantage to this configuration is that the complex insulated mounting ring 890—metallic mounting ring 995—insulated mounting ring 890 sandwich can be simplified to that as shown in FIG. 8, as triple insulation redundancy is typically not required or desired. It is to be understood that the substantially fully coated seal rings or completely non-metallic seal rings of FIGS. 5 and 6 could be used in any or all of the systems shown in FIGS. 7, 8 and 9.

Figure 10:
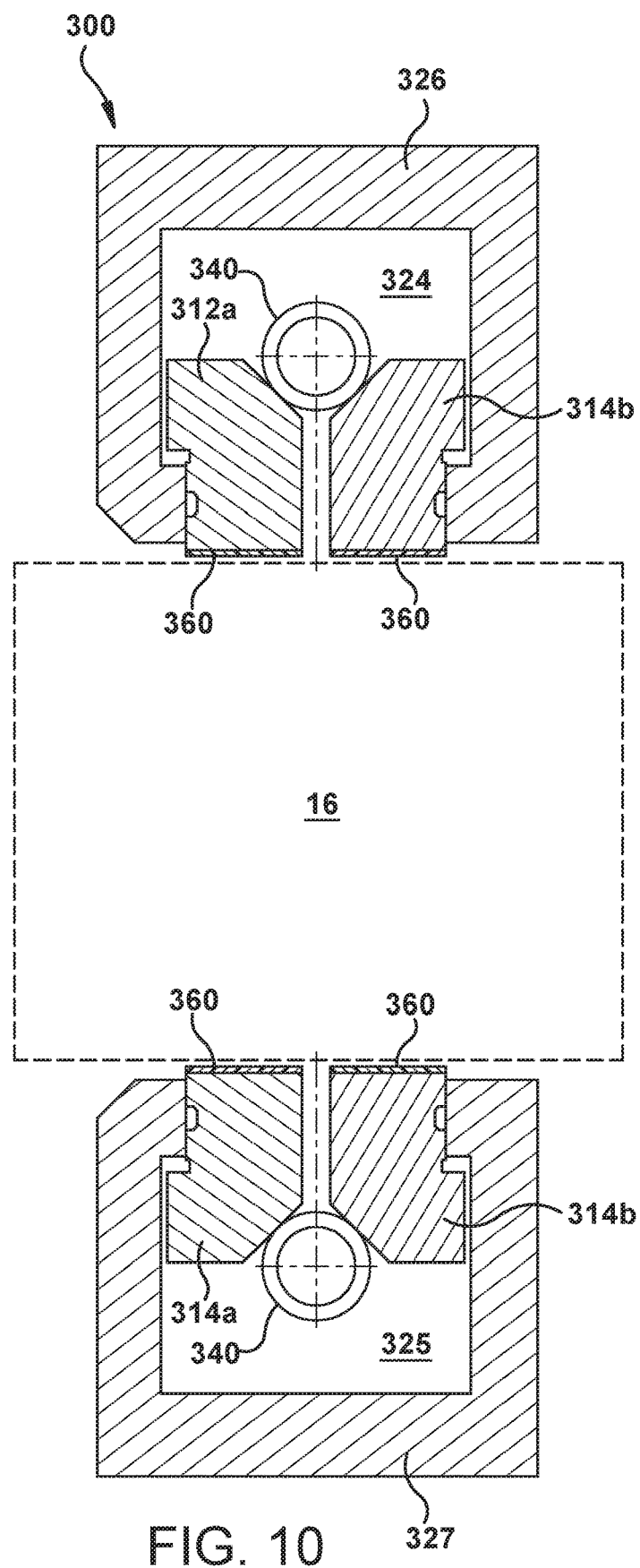
FIG. 10 illustrates a schematic and cross-sectional view of a seal ring assembly for a generator, according to an aspect of the present invention.

FIG. 10 illustrates a schematic and cross-sectional view of a seal ring assembly 300 for a generator. The seal ring assembly 300 is located circumferentially around the rotor shaft 16. An upper seal casing 326 and a lower seal casing 327 are disposed on both sides of the rotor shaft 16 and combine to form a substantially 360 degree seal. The seal casings 326, 327 define radially inwardly directed channels 324, 325. The seal rings 312a, 312b and 314a, 314b are disposed in the radially inwardly directed channels of the seal casings, and each seal ring is resiliently joined about the rotor shaft 16 to form a seal. The seal rings 312a, 312b and 314a, 314b are biased radially inwardly by the one or more springs 340. The spring 340 is seated against adjacent tapered surfaces 313 (see FIG. 4) on the opposing seal rings (e.g., 312a and 312b, or 314a and 314b). The seal rings include an electrically insulating material 360 and/or a non-metallic material 360. The material 360 is located on a radially inward facing surface of the seal ring, and in a location that is directly opposed to the rotor shaft 16.

In summary, adding a non-metallic provision to the hydrogen sealing rings 312 in hydrogen cooled generators effectively introduces another layer of electrical insulation to the system. This allows a standard uninsulated configuration to become single insulated without the need for any mounting ring. It also allows a standard single insulated system to become double insulated without the need for the complex multiple mounting ring arrangement. As stated, triple redundancy in the electrical insulation is not required. Therefore, the standard method of double insulating becomes obsolete with the introduction of non-metallic sealing ring provisions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A seal ring assembly for a rotor shaft comprising:
a seal casing defining a radially inwardly directed channel;
a seal ring disposed in the radially inwardly directed channel of the seal casing, the seal ring being resiliently joined about the shaft to form a seal;
a metallic end shield mounted directly adjacent to and in direct electrically conductive contact with an exterior surface of the seal casing, wherein the metallic end shield electrically couples the seal ring to ground; and
the seal ring comprising an electrically insulating material comprised of an organic thermoplastic polymer or polyether ether ketone, the electrically insulating material located on a radially inward facing surface of the seal ring that is directly opposed to the rotor shaft.

2. The seal ring assembly of claim 1, the electrically insulating material is located on substantially all exterior surfaces of the seal ring.

3. The seal ring assembly of claim 1, the seal ring comprised substantially or entirely of the electrically insulating material.

4. The seal ring assembly of claim 1, the seal ring biased radially inwardly by one or more springs, the seal ring having a tapered surface, the one or more springs configured to be seated against the tapered surface.

5. A seal ring assembly for a rotor shaft comprising:
an upper seal casing defining a first radially inwardly directed channel;
a lower seal casing defining a second radially inwardly directed channel;
a first seal ring and a second seal ring, each respectively disposed in the first and second radially inwardly directed channels of the upper and lower seal casings, the first seal ring and the second seal ring being resiliently joined about the shaft to form a substantially 360° seal, the first seal ring and the second seal ring biased radially inwardly by one or more springs, each of the first and second seal rings having adjacent tapered surfaces, the one or more springs configured to be seated against the adjacent tapered surfaces;
a metallic end shield mounted directly adjacent to and in direct electrically conductive contact with an exterior surface of the upper seal casing or the lower seal casing, wherein the metallic end shield electrically couples the first or the second seal ring to ground; and
each of the first seal ring and the second seal ring comprising an electrically insulating material comprised of an organic thermoplastic polymer.

6. The seal ring assembly of claim 5, wherein the electrically insulating material is located on each of the first seal ring and the second seal ring, in locations that are directly opposed to the rotor shaft.

7. The seal ring assembly of claim 5, wherein the electrically insulating material is located on a radially inwardly facing surface of each of the first seal ring and the second seal ring.

8. The seal ring assembly of claim 5, wherein the electrically insulating material is located on substantially all exterior surfaces of the first seal ring and the second seal ring.

9. The seal ring assembly of claim 5, wherein each of the first seal ring and the second seal ring is comprised substantially or entirely of the electrically insulating material.

10. A seal ring assembly for a rotor shaft comprising:
an upper seal casing defining a first radially inwardly directed channel;
a lower seal casing defining a second radially inwardly directed channel;
a first seal ring and a second seal ring, each respectively disposed in the first and second radially inwardly directed channels of the upper and lower seal casings, the first seal ring and the second seal ring being resiliently joined about the shaft to form a substantially 360° seal, the first seal ring and the second seal ring biased radially inwardly by one or more springs, each of the first and second seal rings having adjacent tapered surfaces, the one or more springs configured to be seated against the adjacent tapered surfaces;
a metallic end shield mounted directly adjacent to and in direct electrically conductive contact with an exterior surface of the upper seal casing or the lower seal casing, wherein the metallic end shield electrically couples the first or the second seal ring to ground; and
each of the first seal ring and the second seal ring comprising an electrically insulating material that is polyether ether ketone.

11. The seal ring assembly of claim 10, wherein the electrically insulating material is located on each of the first seal ring and the second seal ring, in locations that are directly opposed to the rotor shaft.

12. The seal ring assembly of claim 10, wherein the electrically insulating material is located on a radially inwardly facing surface of each of the first seal ring and the second seal ring.

13. The seal ring assembly of claim 10, wherein the electrically insulating material is located on substantially all exterior surfaces of the first seal ring and the second seal ring.

14. The seal ring assembly of claim 10, wherein each of the first seal ring and the second seal ring is comprised substantially or entirely of polyether ether ketone.

15. The seal ring assembly of claim 1, wherein the electrically insulating material is located only on the radially inward facing surface of the seal ring that is directly opposed to the rotor shaft.

16. The seal ring assembly of claim 1, wherein the electrically insulating material has a thickness of about 1 mm to about 4 mm, a dielectric strength of about 15 kV/mm to about 40 kV/mm, and a volume resistivity of about $1 \times 10^7$ Ohms-inch to about $1 \times 10^{15}$ Ohms-inch.

17. The seal ring assembly of claim 5, wherein the electrically insulating material has a thickness of about 1 mm to about 4 mm, a dielectric strength of about 15 kV/mm to about 40 kV/mm, and a volume resistivity of about $1 \times 10^7$ Ohms-inch to about $1 \times 10^{15}$ Ohms-inch.

18. The seal ring assembly of claim 10, wherein the electrically insulating material is located only on the radially inward facing surface of the seal ring that is directly opposed to the rotor shaft.

19. The seal ring assembly of claim 10, wherein the electrically insulating material has a thickness of about 1 mm to about 4 mm, a dielectric strength of about 15 kV/mm to about 40 kV/mm, and a volume resistivity of about $1 \times 10^7$ Ohms-inch to about $1 \times 10^{15}$ Ohms-inch.

20. The seal ring assembly of claim 1, wherein the electrically insulating material is located only on the radially inward facing surface of the seal ring that is directly opposed to the rotor shaft.

* * * * *